US012593353B2

(12) United States Patent
Wu

(10) Patent No.:   US 12,593,353 B2
(45) Date of Patent:      Mar. 31, 2026

(54) METHOD FOR INFORMATION TRANSMISSION, TERMINAL DEVICE, AND NETWORK-SIDE DEVICE

(71) Applicant: VIVO MOBILE COMMUNICATION CO., LTD., Guangdong (CN)

(72) Inventor: Yumin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 672 days.

(21) Appl. No.: 17/385,063

(22) Filed: Jul. 26, 2021

(65) Prior Publication Data

US 2021/0352711 A1      Nov. 11, 2021

Related U.S. Application Data

(63) Continuation of application No. PCT/CN2020/073775, filed on Jan. 22, 2020.

(30) Foreign Application Priority Data

Jan. 28, 2019    (CN) .......................... 201910082036.1

(51) Int. Cl.
*H04W 74/00*          (2009.01)
*H04W 74/0833*       (2024.01)
(52) U.S. Cl.
CPC ...... *H04W 74/006* (2013.01); *H04W 74/0833* (2013.01)
(58) Field of Classification Search
CPC ........... H04W 74/006; H04W 74/0833; H04W 74/002; H04W 56/001; H04W 56/0015; H04W 56/0045; H04W 56/0005; H04W 72/543; H04W 72/51; H04W 72/115; H04W 72/21; H04W 72/02; H04W 72/0493; H04W 72/23; H04W 72/0053; H04W 72/0446; H04W 72/04;
(Continued)

(56) References Cited

U.S. PATENT DOCUMENTS 11,777,629 B2 * 10/2023 Xu ........................ H04J 3/0682
                                                                  370/350
2001/0055311 A1 * 12/2001 Trachewsky .............. H04L 1/20
                                                                  370/445
(Continued)

FOREIGN PATENT DOCUMENTS

CN          107371138 A     11/2017
CN          107439023 A     12/2017
(Continued)

OTHER PUBLICATIONS

Mediatek Inc., "Accurate reference time distribution," 3GPP TSG-RAN WG2 #104, R2-1816690, Spokane, USA Nov. 12-16, 2018 (4 pages).

*Primary Examiner* — Un C Cho
*Assistant Examiner* — Rasha K Fayed
(74) *Attorney, Agent, or Firm* — Price Heneveld LLP

(57)                ABSTRACT

This disclosure provides a method for information transmission, a terminal device, and a network-side device. The method includes: reporting reference time interest information to a network-side device, where the reference time interest information is used to indicate at least one of a reference time of interest to the terminal device and a reference time of no interest to the terminal device.

18 Claims, 3 Drawing Sheets

Report reference time interest information to a network-side device ⌐ 201

Receive reference time interest information reported by a terminal device ⌐ 301

(58) Field of Classification Search
CPC ..... H04W 72/20; H04W 48/08; H04W 48/12;
H04W 4/06; H04W 4/12; H04W 4/20;
H04W 4/44; H04W 4/02; H04W 4/021;
H04W 4/023; H04W 4/029; H04W 4/40;
H04W 36/08; H04W 8/24; H04W 76/27;
H04W 76/20; H04W 28/18; H04W
52/0225; H04W 52/02; H04L 5/0091;
H04L 5/0044; H04L 5/006; H04L 5/0026;
H04L 5/0042; H04L 1/0025; H04L 1/00;
H04L 1/0038; H04L 2001/0093; H04L
27/2613
See application file for complete search history.

(56) References Cited

U.S. PATENT DOCUMENTS

| | | | |
|---|---|---|---|
| 2008/0117102 A1 | 5/2008 | Syrjarinne et al. | |
| 2008/0153512 A1* | 6/2008 | Kale ........................ | H04L 67/52 |
| | | | 455/456.3 |
| 2012/0116861 A1* | 5/2012 | Dobyns ................. | H04W 12/03 |
| | | | 705/14.34 |
| 2014/0003417 A1* | 1/2014 | Shauh ................. | H04W 56/001 |
| | | | 370/350 |
| 2015/0269354 A1* | 9/2015 | Klassen ................. | G06Q 10/10 |
| | | | 700/91 |
| 2016/0095074 A1* | 3/2016 | Park .................... | H04W 56/001 |
| | | | 370/350 |
| 2016/0227367 A1* | 8/2016 | Alsehly ................. | H04W 4/025 |
| 2017/0251500 A1* | 8/2017 | Agiwal ................. | H04W 48/12 |
| 2018/0033030 A1* | 2/2018 | Hansen .............. | G06Q 30/0206 |
| 2018/0103369 A1* | 4/2018 | Chou ........................ | H04W 8/24 |
| 2018/0109918 A1* | 4/2018 | Colonna ................ | H04W 4/022 |
| 2018/0233042 A1* | 8/2018 | Zhang .............. | G08G 1/096791 |
| 2018/0242317 A1 | 8/2018 | Marinier et al. | |
| 2018/0270515 A1* | 9/2018 | Ramaswamy ................................ | |
| | | | H04N 21/234309 |
| 2018/0300379 A1* | 10/2018 | Cha ........................ | G06F 16/248 |
| 2018/0365909 A1* | 12/2018 | Cheng ..................... | H04Q 9/00 |
| 2019/0044598 A1* | 2/2019 | Talarico ................. | H04L 5/001 |
| 2019/0174398 A1 | 6/2019 | Geng et al. | |
| 2019/0213645 A1* | 7/2019 | Webb ................. | G06Q 30/0278 |
| 2019/0297597 A1* | 9/2019 | Zhao ....................... | H04W 4/20 |
| 2019/0320443 A1 | 10/2019 | Wang et al. | |
| 2020/0013132 A1* | 1/2020 | Benson .................. | G01S 19/19 |
| 2020/0045743 A1 | 2/2020 | Lee et al. | |
| 2020/0137028 A1* | 4/2020 | Kim .................... | G06Q 10/0639 |
| 2020/0192658 A1* | 6/2020 | Doebel ..................... | G06F 8/71 |
| 2020/0274714 A1* | 8/2020 | Suson ................... | H04L 9/3239 |
| 2021/0051604 A1* | 2/2021 | Baracca ............. | H04W 52/367 |

FOREIGN PATENT DOCUMENTS

| | | | |
|---|---|---|---|
| EP | 3457602 A1 | 4/2017 | |
| EP | 3493598 A1 | 8/2017 | |
| JP | 2019511166 A | 4/2019 | |
| JP | 2019532602 A | 11/2019 | |
| KR | 20160036674 A | 4/2016 | |
| WO | 2017193774 A1 | 11/2017 | |
| WO | 2018028602 A1 | 2/2018 | |
| WO | 2018119641 A1 | 7/2018 | |
| WO | 2018143608 A1 | 8/2018 | |

* cited by examiner

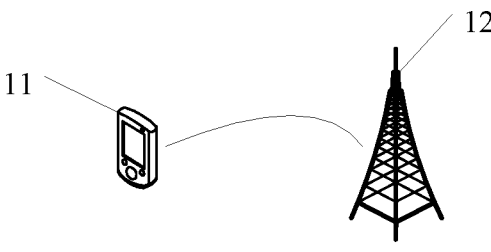
FIG. 1
Report reference time interest information to a network-side device — 201
FIG. 2
Receive reference time interest information reported by a terminal device — 301
FIG. 3
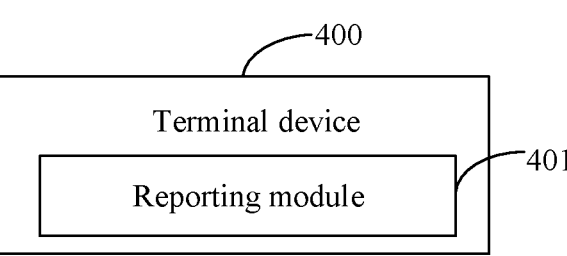
FIG. 4

700

Network-side device

701

Processor

702

Memory

Bus interface

Transceiver

704

703

METHOD FOR INFORMATION TRANSMISSION, TERMINAL DEVICE, AND NETWORK-SIDE DEVICE

CROSS-REFERENCE TO RELATED APPLICATIONS

This application is a continuation application of PCT Application No. PCT/CN2020/073775 filed on Jan. 22, 2020, which claims priority to Chinese Patent Application No. 201910082036.1, filed in China on Jan. 28, 2019, the disclosures of which are incorporated herein by reference in their entireties.

TECHNICAL FIELD

This disclosure relates to the field of communications technologies, and in particular, to a method for information transmission, a terminal device, and a network-side device.

BACKGROUND

In a mobile communications system, such as a long term evolution (LTE) system, a network side may transmit a system message (for example, a system information block (SIB) 16 (SIB16) to user equipment (UE) (also referred to as a terminal device), where the system message may indicate a reference time (for example, Treference).

When the network side provides the reference time to the UE, due to impact of an air interface transmission delay, a time point at which the UE receives the reference time provided by the network-side device is inconsistent with a time point at which the network-side device actually transmits the reference time. In a case that the UE requires a high-precision reference time (for example, 1 μs (microsecond)), the UE may initiate a contention-free random access procedure to obtain an uplink timing advance (TA), and with the uplink timing advance, the UE may correct the received reference time (for example, TA/2 is the air interface transmission delay).

In the related art, the contention-free random access is initiated by the network side, and the network side does not know when the UE needs to obtain the reference time. Consequently, the network side cannot trigger contention-free random access in a timely manner, and the UE cannot correct the received reference time in a timely manner, resulting in low precision of the reference time.

SUMMARY

According to a first aspect, an embodiment of this disclosure provides a method for information transmission, applied to a terminal device and including:

reporting reference time interest information to a network-side device; where the reference time interest information is used to indicate at least one of a reference time of interest to the terminal device and a reference time of no interest to the terminal device.

According to a second aspect, an embodiment of this disclosure further provides a method for information transmission, applied to a network-side device and including:

receiving reference time interest information reported by a terminal device; where the reference time interest information is used to indicate at least one of a reference time of interest to the terminal device and a reference time of no interest to the terminal device.

According to a third aspect, an embodiment of this disclosure further provides a terminal device. The terminal device includes:

a reporting module, configured to report reference time interest information to a network-side device; where the reference time interest information is used to indicate at least one of a reference time of interest to the terminal device and a reference time of no interest to the terminal device.

According to a fourth aspect, an embodiment of this disclosure further provides a network-side device. The network-side device includes:

a receiving module, configured to receive reference time interest information reported by a terminal device; where the reference time interest information is used to indicate at least one of a reference time of interest to the terminal device and a reference time of no interest to the terminal device.

According to a fifth aspect, an embodiment of this disclosure further provides a terminal device, including a processor, a memory, and a computer program stored in the memory and capable of running on the processor. When the computer program is executed by the processor, the steps of the method for information transmission according to the first aspect are implemented.

According to a sixth aspect, an embodiment of this disclosure further provides a network-side device, including a processor, a memory, and a computer program stored in the memory and capable of running on the processor. When the computer program is executed by the processor, the steps of the method for information transmission according to the second aspect are implemented.

According to a seventh aspect, an embodiment of this disclosure further provides a computer-readable storage medium, where a computer program is stored in the computer-readable storage medium, and when the computer program is executed by a processor, the steps of the method for information transmission according to the first aspect are implemented, or the steps of the method for information transmission according to the second aspect are implemented.

BRIEF DESCRIPTION OF DRAWINGS

To describe the technical solutions in the embodiments of this disclosure more clearly, the following briefly introduces the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

FIG. 1 is a structural diagram of a network system to which an embodiment of this disclosure may be applied;

FIG. 2 is a flowchart of a method for information transmission according to an embodiment of this disclosure;

FIG. 3 is a flowchart of a method for information transmission according to still another embodiment of this disclosure;

FIG. 4 is a structural diagram of a terminal device according to an embodiment of this disclosure;

DESCRIPTION OF EMBODIMENTS

Figure 5:
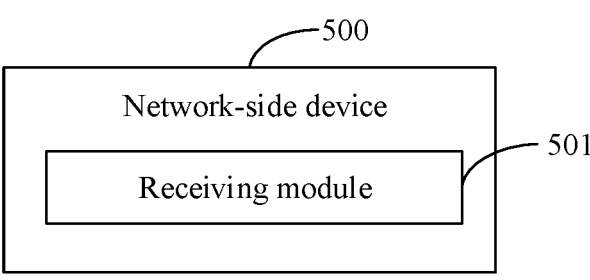
FIG. 5 is a structural diagram of a network-side device according to an embodiment of this disclosure.

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

In the specification and claims of this application, the terms such as "first" and "second" are intended to distinguish between similar objects but do not necessarily indicate a specific order or sequence. It should be understood that the numbers used in this way is interchangeable in appropriate circumstances so that the embodiments of this application described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device. In addition, the use of "and/or" in this specification and the claims represents presence of at least one of the connected objects. For example, A and/or B and/or C represents the following seven cases: A alone, B alone, C alone, both A and B, both B and C, both A and C, and all of A, B, and C.

For ease of description, the following describes some terms included in the embodiments of this disclosure.
1. Reference Time In a mobile communications system, such as a long term evolution (LTE) system, a network side may transmit a system message (for example, a system information block 16 (SIB16) to user equipment (UE) (also referred to as a terminal device), where the system message may indicate a reference time (for example, Treference).

The reference time may include at least one of the following:

coordinated universal time (UTC);

daylight saving time (DST);

global positioning system (GPS) time; and local time.

In a case that the UE receives a reference time, in order to ensure that the time on the UE side is consistent with the time on the network side, the protocol defines that a time position corresponding to the reference time received by the UE is: a boundary of a system frame number (SFN) in which an end boundary of a system message transmission window of the system message is located.

For example, a position of the SIB16 from which the UE receives the reference time is (SFN_2, Subframe 1), and a system message transmission window of the SIB16 is 10 subframes (Subframe) (where there are 10 subframes in one SFN). In this case, an end boundary of a system message window corresponding to the SIB16 from which the UE receives the reference time is (SFN_3, Subframe 1), and the reference time received by the UE corresponds to the end boundary time of SFN_3.

The reference time provided by the network side to the UE comes from a specific clock source. For example, for GPS time provided to the UE by the network side, a clock source of the GPS time may be a GPS satellite; for UTC time provided by the network side to the UE, a clock source of the UTC time may be an atomic clock connected to a network-side device (for example, a base station or a core network device) and capable of providing UTC time. Different clock sources may provide the same or different types of reference time. For example, a clock source 1 and a clock source 2 may both provide UTC time. When different clock sources provide the same or different types of reference time, precision of time information provided by different clock sources may be the same or different. For example, granularity (or time precision) of UTC time provided by the clock source 1 is 1 second, and granularity (or time precision) of UTC time provided by the clock source 2 is 1 microsecond.
2. Uplink Timing After receiving a downlink signal, the UE may determine a position of a subframe for the downlink signal. In order to avoid uplink interference, the network side needs to ensure that signals transmitted by different UEs arrive at fixed moments. Therefore, the network side needs to configure an uplink timing advance, namely TA, for uplink transmission of the UE. After the UE receives the TA value, if the UE wants to transmit an uplink signal, the UE may transmit the uplink signal in advance for the TA value relative to a downlink subframe position.

For obtaining of the TA value: The UE needs to obtain the TA value only in an uplink out-of-synchronization state; therefore, the UE may initiate a random access procedure under trigger of the UE itself or the network side, and the network side delivers the TA value to the UE in a random access response.

For maintenance of the TA value: A location of the UE keeps changing, and therefore validity of the TA value needs to be maintained. To maintain the TA value, the network side may set a time alignment timer (TAT) for the TA value of the UE, and starts the timer when delivering the TA to the UE; and the network side delivers a new TA value to the UE before the TAT expires. To maintain the TA value, the UE may start or restart, when receiving the TA value, the TAT configured by the network side, and considers the TA value to be invalid after the TAT expires. In this case, the UE in the uplink out-of-synchronization state can no longer transmit uplink signals in a cell with uplink out-of-synchronization.

An embodiment of this disclosure provides a method for information transmission. Referring to FIG. 1, FIG. 1 is a structural diagram of a network system to which an embodiment of this disclosure may be applied. As shown in FIG. 1, the network system includes a terminal device 11 and a network-side device 12. The terminal device 11 may be a user-side device such as a mobile phone, a tablet computer (Tablet Personal Computer), a laptop computer, a personal digital assistant (PDA), a mobile Internet device (MID), or a wearable device. It should be noted that a specific type of the terminal device 11 is not limited in the embodiments of this disclosure. The network-side device 12 may be a base station, such as a macro station, an evolved node base station (eNB) in LTE, a 5th generation new radio NodeB (5G NR NB), or a next generation base station (gNB). The network-side device 12 may alternatively be a small cell, such as a low power node (LPN), a pico, or a femto; or the network-side device 12 may be an access point (AP). The base station may alternatively be a network node composed of a central unit (CU) and a plurality of TRPs managed and controlled by the central unit. It should be noted that a specific type of the network-side device 12 is not limited in the embodiments of this disclosure.

In this embodiment, the network-side device 12 may deliver reference time information to the terminal device 11 by using system information (for example, a SIB10) and/or a dedicated message (for example, an RRCConnectionReconfiguration message). The reference time information may include, but is not limited to, at least one of type of reference time, time precision of reference time, and clock source of reference time. It should be noted that the network-side device 12 may deliver one or more pieces of reference time information to the terminal device, where the reference time information may be used to indicate the reference time.

The terminal device 11 may report reference time interest information to the network device 12, where the reference time interest information is information about interest in a reference time by the terminal device, and may be used to indicate at least one of the reference time of interest to the terminal device 11 and a reference time of no interest to the terminal device 11.

Optionally, the reference time interest information may include, but is not limited to, at least one of reference time information of interest and reference time information of no interest. The reference time information of interest may indicate reference time information that has been received, is being received, or is to be received by the terminal device 11, and the reference time information of no interest may indicate reference time information that will be no longer received by the terminal device 11.

After receiving the reference time interest information, the network-side device 12 is able to learn, based on the reference time interest information, whether the terminal device 11 is interested in a related reference time (for example, a reference time delivered by the network side), so as to trigger a correction procedure for a related reference time in a timely manner to improve precision of the reference time.

An embodiment of this disclosure provides a method for information transmission, applied to a terminal device. Referring to FIG. 2, FIG. 2 is a flowchart of a method for information transmission according to an embodiment of this disclosure. As shown in FIG. 2, the method includes the following step.

Step 201: Report reference time interest information to a network-side device.

The reference time interest information is used to indicate at least one of a reference time of interest to the terminal device and a reference time of no interest to the terminal device.

In this embodiment, the reference time interest information is information about interest in a reference time by the terminal device, and may be used to indicate at least one of the reference time of interest to the terminal device and the reference time of no interest to the terminal device.

The reference time of interest to the terminal device may indicate a reference time that has been received, is being received, or is to be received by the terminal device, and the reference time of no interest to the terminal device may indicate a reference time that will be no longer received by the terminal device.

The reference time may include, but is not limited to, one or more of UTC, DST, GPS time, and local time. It should be noted that the reference time information may be used to indicate the reference time.

In actual applications, the network-side device may deliver the reference time information to the terminal device by using system information (for example, a SIB10) and/or a dedicated message (for example, an RRCConnectionReconfiguration message). The terminal device may transmit the reference time interest information to the network-side device, so that the network-side device is able to learn, based on the reference time interest information, whether the terminal device is interested in a related reference time (for example, a reference time delivered by the network side), so as to trigger a random access procedure in a timely manner to correct the related reference time in a timely manner.

In this embodiment of this disclosure, the reference time interest information is reported to the network-side device, where the reference time interest information is used to indicate at least one of the reference time of interest to the terminal device and the reference time of no interest to the terminal device. In this way, the network side is able to learn the reference time interest information of the terminal device in a timely manner, so as to trigger a correction procedure for a related reference time in a timely manner, thereby improving precision of the reference time.

Optionally, the reference time interest information may include at least one of the following:

reference time information of interest; and reference time information of no interest.

In this embodiment, the reference time information of interest may indicate reference time information that has been received, is being received, or is to be received by the terminal device. The reference time information of no interest may indicate reference time information that will be no longer received by the terminal device.

For example, if the reference time information of interest includes time precision a, it indicates that the reference time information whose time precision is time precision a has been received, is being received, or is to be received by the terminal device. If the reference time information of interest includes a clock source being industrial Internet b1, it indicates that the reference time information with a clock source being industrial Internet b1 has been received, is being received, or is to be received by the terminal device. If the reference time information of no interest includes a clock source b2, it indicates that the reference time information with a clock source being industrial Internet b2 will be no longer received by the terminal device. If the reference time information of no interest includes a reference time type DST, it indicates that the reference time information with a reference time type being DST will be no longer received by the terminal device.

In this embodiment of this disclosure, the reference time information of interest and/or the reference time information of no interest are reported to the network-side device, so that the network-side device quickly learns the reference time of interest to the terminal device and/or the reference time of no interest to the terminal device.

Optionally, the reference time information may include at least one of the following:

type of reference time;

time precision of reference time; and clock source of reference time.

In this embodiment, the type of reference time may include UTC, DST, GPS time, or local time. The time precision of reference time may also be referred to as granularity of reference time, for example, may include 1 μs, 1 ms, or 1 s. The clock source of reference time may include a GPS satellite, an atomic clock connected to the network-side device and capable of providing UTC time, an industrial Internet, and the like.

It should be noted that the reference time information of interest may include at least one of the type of reference time, the time precision of reference time, and the clock source of reference time. A value of each parameter may be determined by the terminal device based on an actual situation. It should be noted that the reference time information of no interest may also include at least one of the type of reference time, the time precision of reference time, and the clock source of reference time. A value of each parameter may also be determined by the terminal device based on an actual situation.

For example, the reference time information of interest may include a type a1, time precision a1, and a clock source a1, and the reference time information of no interest may include a type a2, time precision a2, and a clock source a2; or the reference time information of interest may include a type b1, and the reference time information of no interest may include time precision b1; or the reference time information of interest may include a type c1 and time precision c1, and the reference time information of no interest may include a type c2.

Optionally, the reporting reference time interest information to a network-side device includes:

if a protocol predefines that the terminal device is allowed to report reference time interest information, reporting the reference time interest information to a network-side device;

or if first indication information received from the network-side device indicates that the terminal device is allowed to report reference time interest information, reporting the reference time interest information to the network-side device, where the first indication information is used to indicate whether reporting of reference time interest information is allowed.

In an implementation, the protocol may predefine whether the terminal device is allowed to report reference time interest information. In a case that the protocol predefines that the terminal device is allowed to report reference time interest information, the reference time interest information is reported to the network-side device. In a case that the protocol predefines that the terminal device is not allowed to report the reference time interest information, the reference time interest information is not reported to the network-side device.

In this embodiment, whether the terminal device is allowed to report reference time interest information is predefined by the protocol, so as to reduce signalling, featuring relatively simple implementation.

In another implementation, whether the terminal device is allowed to report reference time interest information is indicated by the network-side device. For example, the network-side device may indicate, by using system information (for example, a SIBx) or dedicated signaling (for example, an RRCReconfiguration message), whether the terminal device is allowed to report reference time interest information. The terminal device can report the reference time interest information only when the network-side device indicates being allowed to receive the reference time interest information reported by the terminal device.

For another example, the network-side device may indicate network-side capability information by using system information (for example, a SIBx) or dedicated signaling (for example, an RRCReconfiguration message), so as to indicate whether to support receiving the reference time interest information reported by the terminal device. In this case, the terminal device can report the reference time interest information only when the network-side device indicates that the network-side device supports receiving the reference time interest information reported by the terminal device.

In this embodiment, whether the terminal device is allowed to report reference time interest information is indicated by the network-side device, thereby improving flexibility in control of reporting the reference time interest information.

Optionally, a trigger condition for reporting the reference time interest information by the terminal device to the network-side device may include one of the following:

the terminal device is interested in at least one piece of reference time information;

the terminal device is not interested in at least one piece of reference time information;

the terminal device has changed interest in at least one piece of reference time information;

first content reported by the terminal device has changed, where the first content includes content of reference time information of interest reported by the terminal device or content of reference time information of no interest reported by the terminal device; and the terminal device detects that reference time information received by the terminal device needs to be corrected.

In this embodiment, the at least one piece of reference time information may be any reference time information.

In an implementation, in a case that the terminal device is interested in one or more pieces of reference time information, the terminal device may report the reference time interest information to the network-side device. For example, the terminal device may report the reference time interest information to the network-side device in a case that one specified piece of reference time information has been received, is being received, or is to be received by the terminal device.

In another implementation, the terminal device may report the reference time interest information to the network-side device in a case that the terminal device is not interested in one or more pieces of reference time information. For example, the terminal device may report the reference time interest information to the network-side device in a case that the terminal device determines to no longer receive one specified piece of reference time information.

In another implementation, the terminal device may report the reference time interest information to the network-side device in a case that the terminal device has changed interest in at least one piece of reference time information, for example, for one specified piece of reference time information, from being interested to being not interested, or from being not interested to being interested.

In another implementation, the terminal device may report the reference time interest information to the network-side device in a case that content of the reference time information of interest reported by the terminal device or content of the reference time information of no interest reported by the terminal device has changed. For example, a type of a reference time of interest last reported by the terminal device is UTC, and now is changed to DTS; or time precision of a reference time of interest last reported by the terminal device is 1 s, and now is changed to 1 µs; or a clock source of a reference time of interest last reported by the UE is industrial Internet 1, and now is changed to industrial Internet 2; and so on.

In another implementation, the terminal device may report the reference time interest information to the network-side device in a case that the terminal device detects that reference time information received by the terminal device needs to be corrected. For example, if the UE detects that an uplink timing advance (TA) of the UE exceeds a threshold, the UE reports the reference time interest information to the network-side device.

In this embodiment, in a case that a trigger condition is satisfied, the terminal device is triggered to report the reference time interest information, so as to reduce unnecessary reporting of the reference time interest information, thereby saving resources.

Optionally, a determining condition for the terminal device to detect that the reference time information received by the terminal device needs to be corrected includes one of the following:

a path loss measured by the terminal device is greater than or equal to a first threshold;

a path loss variation measured by the terminal device is greater than or equal to a second threshold;

an uplink timing advance of the terminal device is greater than or equal to a third threshold;

an uplink timing advance variation measured by the terminal device is greater than or equal to a fourth threshold; and indication information received by the terminal device from the network-side device indicates that a cell requires to correct the reference time information.

In this embodiment, at least one of the first threshold, the second threshold, the third threshold, and the fourth threshold may be configured by the network side, or may be predefined by the protocol.

In an implementation, in a case that the path loss variation measured by the terminal device is greater than or equal to the second threshold, it may be determined that the terminal device has detected that the reference time information received by the terminal device needs to be corrected. For example, if a path loss during previous reference time calibration is P1, a path loss during current reference time calibration is P2, and the second threshold is T2, when (P2−P1)≥T2, it is determined that the reference time information received by the UE needs to be corrected.

In another implementation, in a case that the uplink timing advance of the terminal device is greater than or equal to the third threshold, it may be determined that the terminal device has detected that the reference time information received by the terminal device needs to be corrected. For example, if the uplink timing advance is TA and the third threshold is Threshold, when TA≥Threshold, it is determined that the reference time information received by the UE needs to be corrected; if the uplink timing advance is TA/2, when TA/2≥Threshold, it is determined that the reference time information received by the UE needs to be corrected.

In another implementation, in a case that the uplink timing advance variation measured by the terminal device is greater than or equal to the fourth threshold, it may be determined that the terminal device has detected that the reference time information received by the terminal device needs to be corrected. For example, a previous uplink timing advance variation is TA1, a current uplink timing advance variation is TA2, and the fourth threshold is T4. Then, when (TA2−TA1)≥T4, it is determined that the reference time information received by the UE needs to be corrected.

In another implementation, in a case that indication information received by the terminal device from the network-side device indicates that a cell requires to correct the reference time information, it may be determined that the terminal device has detected that the reference time information received by the terminal device needs to be corrected. For example, the network-side device may indicate, for a macro cell (namely, a cell with a relatively large radius), that all UEs in the cell need to correct reference time information with precision of 1 μs.

It should be noted that in this embodiment, the reference time interest information may be directly reported to the network-side device in a case that the path loss measured by the terminal device may be greater than or equal to the first threshold, or the path loss variation measured by the terminal device may be greater than or equal to the second threshold, or the uplink timing advance of the terminal device may be greater than or equal to the third threshold, or the uplink timing advance variation measured by the terminal device is greater than or equal to the fourth threshold, or the indication information received by the terminal device from the network-side device indicates the cell requires the reference time information to be corrected.

Optionally, after the reporting reference time interest information to a network-side device, the method further includes:

starting a prohibit timer; where before the prohibit timer expires, the terminal device is prohibited from reporting reference time interest information.

In this embodiment, after the terminal device reports the reference time interest information, the prohibit timer may be started, and during running of the prohibit timer, reporting of the reference time interest information is no longer triggered.

In this embodiment, reporting of the reference time interest information is prohibited before the prohibit timer expires, repeated reporting of the reference time interest information can be reduced, thereby saving resources.

Optionally, a parameter of the prohibit timer is predefined by the protocol or configured by the network side.

In this embodiment, the parameter of the prohibit timer may include duration of the prohibit timer.

An embodiment of this disclosure provides a method for information transmission, applied to a network-side device. Referring to FIG. 3, FIG. 3 is a flowchart of a method for information transmission according to an embodiment of this disclosure. As shown in FIG. 3, the method includes the following step.

Step 301: Receive reference time interest information reported by a terminal device.

The reference time interest information is used to indicate at least one of a reference time of interest to the terminal device and a reference time of no interest to the terminal device.

In this embodiment, the reference time interest information is information about interest in a reference time by the terminal device, and may be used to indicate at least one of the reference time of interest to the terminal device and the reference time of no interest to the terminal device.

The reference time of interest to the terminal device may indicate a reference time that has been received, is being received, or is to be received by the terminal device, and the reference time of no interest to the terminal device may indicate a reference time that will be no longer received by the terminal device.

The reference time may include, but is not limited to, one or more of UTC, DST, GPS time, and local time. It should be noted that the reference time information may be used to indicate the reference time.

In actual applications, the network-side device may deliver the reference time information to the terminal device by using system information (for example, a SIB10) and/or a dedicated message (for example, an RRCConnectionReconfiguration message), and receive the reference time interest information from the terminal device, so that the network-side device is able to learn, based on the reference time interest information, whether the terminal device is interested in a related reference time (for example, the reference time delivered by the network side), so as to trigger a random access procedure in a timely manner and correct the related reference time in a timely manner.

In this embodiment of this disclosure, the reference time interest information reported by the terminal device is received, where the reference time interest information may be used to indicate at least one of the reference time of interest to the terminal device and the reference time of no interest to the terminal device. In this way, the network side is able to learn the reference time interest information of the terminal device in a timely manner, so as to trigger a correction procedure for a related reference time in a timely manner, thereby improving precision of the reference time.

Optionally, the reference time interest information may include at least one of the following:

reference time information of interest; and reference time information of no interest.

In this embodiment, the reference time information of interest may indicate reference time information that has been received, is being received, or is to be received by the terminal device. The reference time information of no interest may indicate reference time information that will be no longer received by the terminal device.

For example, if the reference time information of interest includes time precision a, it indicates that the reference time information whose time precision is time precision a has been received, is being received, or is to be received by the terminal device. If the reference time information of interest includes a clock source being industrial Internet b 1, it indicates that the reference time information with a clock source being industrial Internet b1 has been received, is being received, or is to be received by the terminal device. If the reference time information of no interest includes a clock source b2, it indicates that the reference time information with a clock source being industrial Internet b2 will be no longer received by the terminal device. If the reference time information of no interest includes a reference time type DST, it indicates that the reference time information with a reference time type being DST will be no longer received by the terminal device.

In this embodiment of this disclosure, the reference time information of interest and/or the reference time information of no interest are reported to the network-side device, so that the network-side device quickly learns the reference time of interest to the terminal device and/or the reference time of no interest to the terminal device.

Optionally, the reference time information may include at least one of the following:

type of reference time;

time precision of reference time; and clock source of reference time.

In this embodiment, the type of reference time may include UTC, DST, GPS time, or local time. The time precision of reference time may also be referred to as granularity of reference time, for example, may include 1 μs, 1 ms, or 1 s. The clock source of reference time may include a GPS satellite, an atomic clock connected to the network-side device and capable of providing UTC time, an industrial Internet, and the like.

It should be noted that the reference time information of interest may include at least one of the type of reference time, the time precision of reference time, and the clock source of reference time. A value of each parameter may be determined by the terminal device based on an actual situation. It should be noted that the reference time information of no interest may also include at least one of: the type of reference time, the time precision of reference time, and the clock source of reference time. A value of each parameter may also be determined by the terminal device based on an actual situation.

For example, the reference time information of interest may include a type a1, time precision a1, and a clock source a1, and the reference time information of no interest may include a type a2, time precision a2, and a clock source a2; or the reference time information of interest may include a type b1, and the reference time information of no interest may include time precision b1; or the reference time information of interest may include a type c1 and time precision c1, and the reference time information of no interest may include a type c2.

Optionally, the method may further include:

transmitting first indication information to the terminal device, where the first indication information is used to indicate whether the terminal device is allowed to report reference time interest information.

In this embodiment, whether the terminal device is allowed to report reference time interest information is indicated by the network-side device.

For example, the network-side device may indicate, by using system information (for example, a SIBx) or dedicated signaling (for example, an RRCReconfiguration message), whether the terminal device is allowed to report reference time interest information.

For another example, the network-side device may indicate network-side capability information by using system information (for example, a SIBx) or dedicated signaling (for example, an RRCReconfiguration message), so as to indicate whether to support receiving the reference time interest information reported by the terminal device. In this case, the terminal device can report the reference time interest information only when the network-side device indicates that the network-side device supports receiving the reference time interest information reported by the terminal device.

In this embodiment, whether the terminal device is allowed to report reference time interest information is indicated by the network-side device, thereby improving flexibility in control of reporting the reference time interest information.

Optionally, the method further includes:

configuring a parameter of a prohibit timer for the terminal device.

In this embodiment, the parameter of the prohibit timer may include duration of the prohibit timer.

Optionally, the network-side device is a source node.

After the receiving reference time interest information reported by a terminal device, the method further includes:

transmitting the reference time interest information to a destination node.

In this embodiment, for a mobility process, the source node may receive the reference time interest information transmitted by the terminal device and transmit the reference time interest information to the destination node.

For example, a gNB1 transmits the reference time interest information received from the terminal device to a destination gNB2 in a handover process; or a master node (MN) or a secondary node (SN) transmits the reference time interest information received from the terminal device to a destination SN in an SN addition or change process.

The following describes this embodiment of this disclosure by using examples.

The method for information transmission provided in this embodiment of this disclosure includes the following steps.

Step a1: The network side delivers reference time information to the UE by using system information (for example, a SIB10) and/or a dedicated message (for example, an RRCConnectionReconfiguration message).

Optionally, whether the UE is allowed to report reference time interest information of the UE is configured by the network side or specified by the protocol.

For example, the network side may indicate, by using system information (for example, a SIBx) or dedicated signaling (for example, an RRCReconfiguration message), whether the UE is allowed to report the reference time interest information.

For another example, the network side may indicate network-side capability information by using system information (for example, a SIBx) or dedicated signaling (for example, an RRCReconfiguration message), so as to indicate whether to support receiving the reference time interest information reported by the UE. In this case, the UE can report the reference time interest information only when the network side indicates to support receiving the reference time interest information reported by the UE.

Optionally, the network side may further configure or the protocol defines a prohibit timer (prohibitTimer) configuration (for example, duration of the prohibit timer), and during running of the prohibit timer, the UE is not allowed to report the reference time interest information.

Step a2: The UE reports the reference time interest information to the network side.

The reference time interest information may include a combination of one or more of the following:

reference time information of interest; and reference time information of no interest.

The reference time information of interest may indicate reference time information that has been received, is being received, or is to be received by UE.

The reference time information of no interest may indicate reference time information that will be no longer received by the UE.

The reference time information may include a combination of one or more of the following:

type of reference time, for example, UTC, DST, GPS time, or local time;

time precision of reference time, for example, 1 μs, or 1 ms, or 1 s; and clock source of reference time, for example, clock information provided by industrial Internet 1 or clock information provided by industrial Internet 2.

A trigger condition for reporting the reference time interest information by the UE may include any one of the following:

the UE is interested in one specified piece of reference time information;

the UE is not interested in one specified piece of reference time information;

the UE has changed interest in one specified piece of reference time information, for example, from being interested to being not interested, or from being not interested to being interested;

content of the reference time information of interest reported by the UE or content of the reference information of no interest reported by the UE has changed, for example, a type of a reference time of interest last reported by the UE is UTC, and now is changed to DTS; or time precision of a reference time of interest last reported by the UE is 1 s, and now is changed to 1 μs; or a clock source of a reference time of interest last reported by the UE is industrial Internet 1, and now is changed to industrial Internet 2; and the UE detects that the reference time information received by the UE needs to be corrected, for example, the UE detects that a TA of the UE exceeds a threshold.

Optionally, a determining condition (that is, whether the reference time information needs to be corrected) for the UE to detect that the reference time information received by the UE needs to be corrected includes any one of the following:

a path loss measured by the UE is greater than or equal to a first threshold, where the first threshold may be configured by the network side or specified by the protocol;

a path loss variation measured by the UE is greater than or equal to a second threshold, where the second threshold may be configured by the network side or specified by the protocol, for example, if a path loss during previous reference time calibration is P1, a current path loss is P2, and the second threshold is T2, when $(P2-P1) \geq T2$, it is determined that the reference time information received by the UE needs to be corrected;

an uplink timing advance of the UE is greater than or equal to a third threshold, where the threshold may be configured by the network side or specified by the protocol, for example, if the uplink timing advance is TA and the third threshold is Threshold, when $TA \geq Threshold$, it is determined that the reference time information received by the UE needs to be corrected; if the uplink timing advance is TA/2, when $TA/2 \geq Threshold$, it is determined that the reference time information received by the UE needs to be corrected; and an uplink timing advance variation measured by the UE is greater than or equal to a fourth threshold, where the threshold may be configured by the network side or specified by the protocol, for example, a previous uplink timing advance variation is TA1 (or TA1/2), a current uplink timing advance variation is TA2 (or TA2/2), and the fourth threshold is T4; then, when $(TA2-TA1) \geq T4$, it is determined that the reference time information received by the UE needs to be corrected.

The indication information received by the UE from the network side indicates that a specific cell requires the reference time information to be corrected. For example, the network side may indicate, for a macro cell (namely, a cell with a relatively large radius), that all UEs in the cell need to correct reference time information with precision of 1 μs.

Optionally, if the network side configures or the protocol defines a prohibit timer configuration, the UE starts the prohibit timer after reporting the reference time interest information, and does not trigger reporting of the reference time interest information during running of the prohibit timer.

Optionally, a source node that receives the reference time interest information reported by the UE may transmit the reference time interest information to a destination node in a mobility process.

For example, a gNB1 transmits the reference time interest information to a destination gNB2 in a handover process; or an MN or an SN transmits the reference time interest information received from the terminal device to a destination SN in an SN addition or change process.

According to the method for information transmission provided in this embodiment of this disclosure, the UE reports information about interest of the UE in the reference time, so that the network side is able to know whether the UE is interested in receiving the reference time and what precision is required for the reference time. In this way, the network side can trigger a correction procedure for a related reference time in a timely manner, and the UE can obtain a more accurate reference time.

Referring to FIG. 4, FIG. 4 is a structural diagram of a terminal device according to an embodiment of this disclosure. As shown in FIG. 4, the terminal device 400 includes:

a reporting module 401, configured to report reference time interest information to a network-side device.

The reference time interest information is used to indicate at least one of a reference time of interest to the terminal device and a reference time of no interest to the terminal device.

Optionally, the reporting module is specifically configured to:

if a protocol predefines that the terminal device is allowed to report reference time interest information, report the reference time interest information to a network-side device;

or if first indication information received from the network-side device indicates that the terminal device is allowed to report reference time interest information, report the reference time interest information to the network-side device, where the first indication information is used to indicate whether reporting of reference time interest information is allowed.

Optionally, the reference time interest information includes at least one of the following:

reference time information of interest; and reference time information of no interest.

Optionally, the reference time information includes at least one of the following:

type of reference time;

time precision of reference time; and clock source of reference time.

Optionally, a trigger condition for reporting the reference time interest information by the terminal device to the network-side device includes one of the following:

the terminal device is interested in at least one piece of reference time information;

the terminal device is not interested in at least one piece of reference time information;

the terminal device has changed interest in at least one piece of reference time information;

first content reported by the terminal device has changed, where the first content includes content of reference time information of interest reported by the terminal device or content of reference time information of no interest reported by the terminal device; and the terminal device detects that reference time information received by the terminal device needs to be corrected.

Optionally, a determining condition for the terminal device to detect that the reference time information received by the terminal device needs to be corrected includes one of the following:

a path loss measured by the terminal device is greater than or equal to a first threshold;

a path loss variation measured by the terminal device is greater than or equal to a second threshold;

an uplink timing advance of the terminal device is greater than or equal to a third threshold;

an uplink timing advance variation measured by the terminal device is greater than or equal to a fourth threshold; and indication information received by the terminal device from the network-side device indicates that a cell requires to correct the reference time information.

Optionally, after the reporting reference time interest information to a network-side device, the terminal device is further configured to:

start a prohibit timer; where before the prohibit timer expires, the terminal device is prohibited from reporting reference time interest information.

Optionally, a parameter of the prohibit timer is predefined by the protocol or configured by the network side.

The terminal device 400 provided in this embodiment of this disclosure is capable of implementing processes that are implemented by the terminal device in the foregoing method embodiment. To avoid repetition, details are not described herein again.

According to the terminal device 400 in this embodiment of this disclosure, the reporting module 401 is configured to report the reference time interest information to the network-side device, where the reference time interest information may be used to indicate at least one of the reference time of interest to the terminal device and the reference time of no interest to the terminal device. In this way, the network side is able to learn the reference time interest information of the terminal device in a timely manner, so as to trigger a correction procedure for a related reference time in a timely manner, thereby improving precision of the reference time.

Referring to FIG. 5, FIG. 5 is a structural diagram of a network-side device according to an embodiment of this disclosure. As shown in FIG. 5, the network-side device 500 includes:

a receiving module 501, configured to receive reference time interest information reported by a terminal device.

The reference time interest information is used to indicate at least one of a reference time of interest to the terminal device and a reference time of no interest to the terminal device.

Optionally, the network-side device further includes:

a first transmitting module, configured to transmit first indication information to the terminal device, where the first indication information is used to indicate whether the terminal device is allowed to report reference time interest information.

Optionally, the reference time interest information includes at least one of the following:

reference time information of interest; and reference time information of no interest.

Optionally, the reference time information includes at least one of the following:

type of reference time;

time precision of reference time; and clock source of reference time.

Optionally, the network-side device further includes:

a configuration module, configured to configure a parameter of a prohibit timer for the terminal device.

Optionally, the network-side device is a source node.

The network-side device further includes:

a second transmitting module, configured to transmit the reference time interest information to a destination node after receiving the reference time interest information reported by the terminal device.

The network-side device 500 provided in this embodiment of this disclosure is capable of implementing processes that are implemented by the network-side device in the foregoing method embodiment. To avoid repetition, details are not described herein again.

According to the network-side device 500 in this embodiment of this disclosure, the receiving module 501 is configured to receive the reference time interest information reported by the terminal device, where the reference time interest information is used to indicate at least one of the reference time of interest to the terminal device and the reference time of no interest to the terminal device. In this way, the network side is able to learn the reference time interest information of the terminal device in a timely manner, so as to trigger a correction procedure for a related reference time in a timely manner, thereby improving precision of the reference time.

Figure 6:
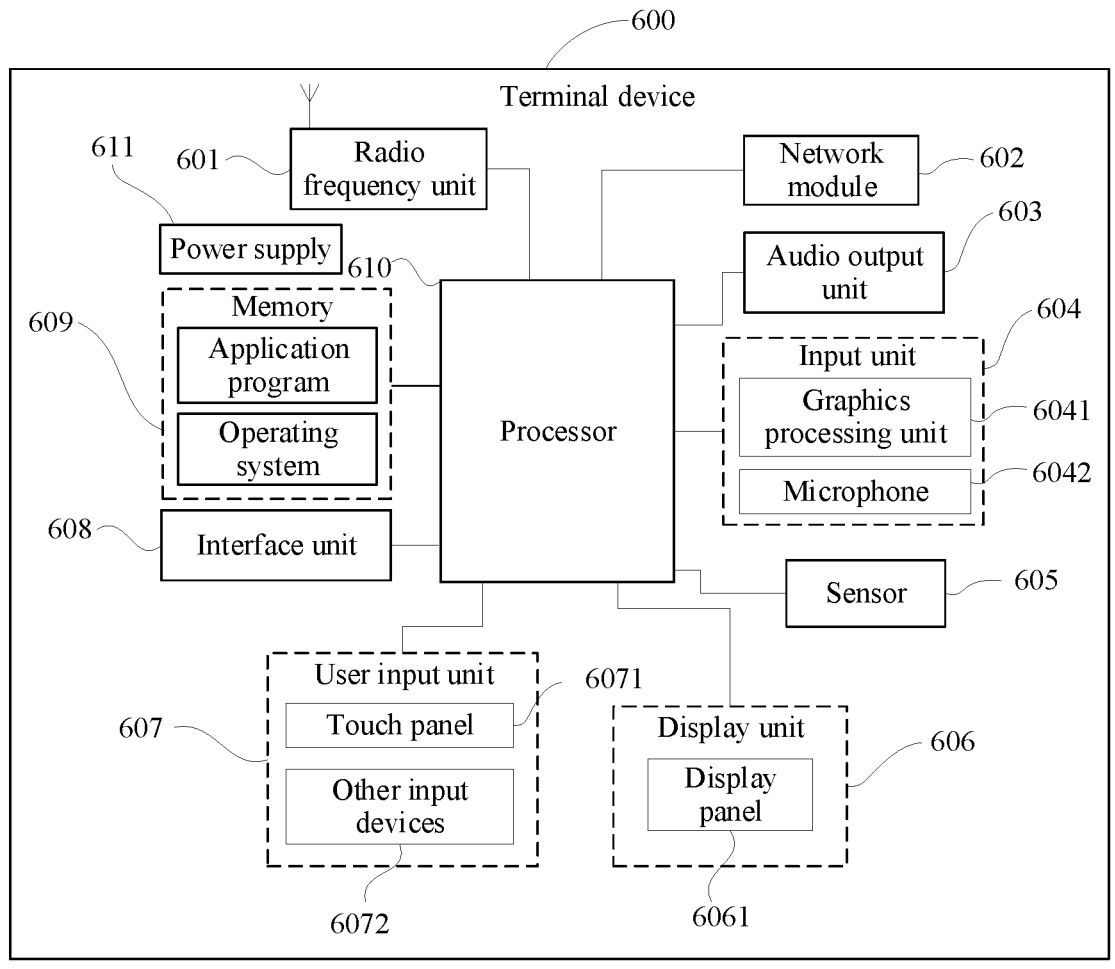
FIG. 6 is a structural diagram of a terminal device according to another embodiment of this disclosure.

FIG. 6 is a structural diagram of a terminal device according to another embodiment of this disclosure. Referring to FIG. 6, the terminal device 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art can understand that the structure of the terminal device shown in FIG. 6 does not constitute any limitation on the terminal device. The terminal device may include more or fewer components than those shown in the figure, or a combination of some components, or the components disposed differently. In this embodiment of this disclosure, the terminal device includes but is not limited to a mobile phone, a tablet computer, a laptop computer, a personal digital assistant, an in-vehicle terminal, a wearable device, a pedometer, and the like.

The processor 610 is configured to report reference time interest information to a network-side device.

The reference time interest information is used to indicate at least one of a reference time of interest to the terminal device and a reference time of no interest to the terminal device.

In this embodiment of this disclosure, the reference time interest information is reported to the network-side device. In this way, the network side is able to learn the reference time interest information of the terminal device in a timely manner, so as to trigger a correction procedure for a related reference time in a timely manner, thereby improving precision of the reference time.

Optionally, the processor 610 is further configured to:

if a protocol predefines that the terminal device is allowed to report reference time interest information, report the reference time interest information to a network-side device;

or if first indication information received from the network-side device indicates that the terminal device is allowed to report reference time interest information, report the reference time interest information to the network-side device, where the first indication information is used to indicate whether reporting of reference time interest information is allowed.

Optionally, the reference time interest information includes at least one of the following:

reference time information of interest; and reference time information of no interest.

Optionally, the reference time information includes at least one of the following:

type of reference time;

time precision of reference time; and clock source of reference time.

Optionally, a trigger condition for reporting the reference time interest information by the terminal device to the network-side device includes one of the following:

the terminal device is interested in at least one piece of reference time information;

the terminal device is not interested in at least one piece of reference time information;

the terminal device has changed interest in at least one piece of reference time information;

first content reported by the terminal device has changed, where the first content includes content of reference time information of interest reported by the terminal device or content of reference time information of no interest reported by the terminal device; and the terminal device detects that reference time information received by the terminal device needs to be corrected.

Optionally, a determining condition for the terminal device to detect that the reference time information received by the terminal device needs to be corrected includes one of the following:

a path loss measured by the terminal device is greater than or equal to a first threshold;

a path loss variation measured by the terminal device is greater than or equal to a second threshold;

an uplink timing advance of the terminal device is greater than or equal to a third threshold;

an uplink timing advance variation measured by the terminal device is greater than or equal to a fourth threshold; and indication information received by the terminal device from the network-side device indicates that a cell requires to correct the reference time information.

Optionally, the processor 610 is further configured to:

start a prohibit timer after reporting the reference time interest information to the network-side device.

Before the prohibit timer expires, the terminal device is prohibited from reporting reference time interest information.

Optionally, a parameter of the prohibit timer is predefined by the protocol or configured by the network side.

It should be understood that in this embodiment of this disclosure, the radio frequency unit 601 may be configured to: receive and transmit signals in an information receiving/transmitting process or a call process; and specifically, after receiving downlink data from a base station, transmit the downlink information to the processor 610 for processing, and in addition, transmit uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 may also communicate with a network and other devices via a wireless communications system.

The terminal device provides a user with wireless broadband internet access through the network module 602, for example, helping the user to transmit and receive e-mails, browse web pages, and access streaming media.

The audio output unit 603 may convert audio data received by the radio frequency unit 601 or the network module 602 or stored in the memory 609 into an audio signal and output the audio signal as a sound. Furthermore, the audio output unit 603 may also provide audio output (for example, a call signal received sound or a message received sound) related to a specific function performed by the terminal device 600. The audio output unit 603 includes a speaker, a buzzer, a receiver, and the like.

The input unit 604 is configured to receive an audio or video signal. The input unit 604 may include a graphics processing unit (GPU) 6041 and a microphone 6042. The graphics processing unit 6041 processes image data of a still picture or video obtained by an image capture apparatus (such as a camera) in a video capture mode or an image capture mode. A processed image frame may be displayed on the display unit 606. The image frame processed by the graphics processing unit 6041 may be stored in the memory 609 (or another storage medium) or be transmitted by the radio frequency unit 601 or the network module 602. The microphone 6042 is capable of receiving sounds and processing such sounds into audio data. The processed audio data may be converted in a telephone call mode into a format that can be transmitted by the radio frequency unit 601 to a mobile communications base station, for outputting.

The terminal device 600 may further include at least one sensor 605, for example, an optical sensor, a motion sensor, and other sensors. Specifically, the optical sensor may include an ambient light sensor and a proximity sensor. The ambient light sensor may adjust luminance of the display panel 6061 based on brightness of ambient light, and the proximity sensor may turn off the display panel 6061 and/or backlight when the terminal device 600 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal device, functions related to vibration recognition (such as pedometer and tapping), and the like. The sensor 605 may also include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information input by the user or information provided to the user. The display unit 606 may include a display panel 6061, and the display panel 6061 may be configured in a form of a liquid crystal display (LCD), an organic light-emitting diode (OLED), or the like.

The user input unit 607 may be configured to receive input digit or character information and generate key signal input related to user setting and function control of the terminal device. Specifically, the user input unit 607 may include a touch panel 6071 and other input devices 6072. The touch panel 6071 is also referred to as a touchscreen and can collect a touch operation (such as an operation performed by the user on the touch panel 6071 or near the touch panel 6071 with a finger or by using any proper object or accessory such as a stylus) of the user on or near the touch panel 6071. The touch panel 6071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 610, and can receive a command transmitted by the processor 610 and execute the command. In addition, the touch panel 6071 may be implemented in a plurality of forms, for example, as a resistive, capacitive, infrared, or surface acoustic wave touch panel. In addition to the touch panel 6071, the user input unit 607 may further include other input devices 6072.

Specifically, the other input devices 6072 may include but are not limited to a physical keyboard, a function key (such as a volume control key or an on/off key), a trackball, a mouse, and a joystick. Details are not described herein.

Further, the touch panel 6071 may cover the display panel 6061. When detecting a touch operation on or near the touch panel 6071, the touch panel 6061 transmits the touch operation to the processor 610 to determine a type of a touch event. Then, the processor 610 provides a corresponding visual output on the display panel 6061 based on the type of the touch event. Although in FIG. 6, the touch panel 6071 and the display panel 6061 act as two independent parts to implement input and output functions of the terminal device, in some embodiments, the touch panel 6071 and the display panel 6061 may be integrated to implement the input and output functions of the terminal device. This is not specifically limited herein.

The interface unit 608 is an interface between an external apparatus and the terminal device 600. For example, an external apparatus may include a wired or wireless headset port, an external power supply (or a battery charger) port, a wired or wireless data port, a memory card port, a port for connecting an apparatus with an identification module, an audio input/output (I/O) port, a video I/O port, an earphone port, and the like. The interface unit 608 may be configured to receive an input (for example, data information or power) from an external apparatus and transmit the received input to one or more elements within the terminal device 600, or may be configured to transmit data between the terminal device 600 and the external apparatus.

The memory 609 may be configured to store software programs and various data. The memory 609 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 609 may include a high-speed random access memory, and may further include a non-volatile memory such as at least one disk storage device, a flash memory device, or another volatile solid-state storage device.

The processor 610 is a control center of the terminal device, uses various interfaces and lines to connect parts of the entire terminal device, and executes various functions and processing data of the terminal device by running or executing software programs and/or modules stored in the memory 609 and invoking data stored in the memory 609, so as to perform overall monitoring on the terminal device. The processor 610 may include one or more processing units. Optionally, an application processor and a modem processor may be integrated in the processor 610. The application processor primarily processes an operating system, user interfaces, application programs, and the like. The modem processor primarily processes radio communication. It can be understood that the modem processor may alternatively be not integrated in the processor 610.

The terminal device 600 may further include a power supply 611 (such as a battery) that supplies power to components. Optionally, the power supply 611 may be logically connected to the processor 610 through a power management system. In this way, functions such as charge management, discharge management, and power consumption management are implemented by using the power management system.

In addition, the terminal device 600 includes some functional modules that are not shown. Details are not described herein.

Optionally, an embodiment of this disclosure further provides a terminal device, including a processor 610, a memory 609, and a computer program stored in the memory 609 and capable of running on the processor 610. When the computer program is executed by the processor 610, the processes of the embodiment of the foregoing method for information transmission can be implemented, with same technical effects achieved. To avoid repetition, details are not described herein again.

Figure 7:
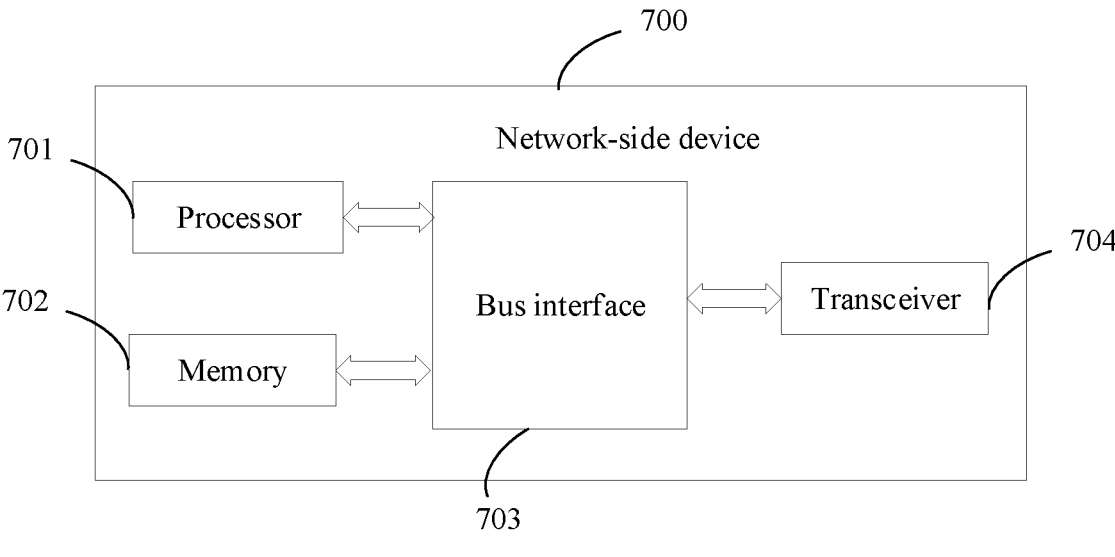
FIG. 7 is a structural diagram of a network-side device according to another embodiment of this disclosure.

Referring to FIG. 7, FIG. 7 is a structural diagram of a network-side device according to another embodiment of this disclosure. As shown in FIG. 7, the network-side device 700 includes: a processor 701, a memory 702, a bus interface 703, and a transceiver 704, where the processor 701, the memory 702, and the transceiver 704 are all connected to the bus interface 703.

In this embodiment of this disclosure, the network-side device 700 further includes a computer program stored in the memory 702 and capable of running on the processor 701.

In this embodiment of this disclosure, the transceiver 704 is configured to:

receive reference time interest information reported by a terminal device.

The reference time interest information is used to indicate at least one of a reference time of interest to the terminal device and a reference time of no interest to the terminal device.

Optionally, the transceiver 704 is further configured to:

transmit first indication information to the terminal device, where the first indication information is used to indicate whether the terminal device is allowed to report reference time interest information.

Optionally, the reference time interest information includes at least one of the following:

reference time information of interest; and reference time information of no interest.

Optionally, the reference time information includes at least one of the following:

type of reference time;

time precision of reference time; and clock source of reference time.

Optionally, the transceiver 704 is further configured to:

configure a parameter of a prohibit timer for the terminal device.

Optionally, the network-side device is a source node.

the transceiver 704 is further configured to:

transmit the reference time interest information to a destination node after receiving the reference time interest information reported by the terminal device.

An embodiment of this disclosure further provides a computer-readable storage medium, where a computer program is stored in the computer readable storage medium. When the computer program is executed by a processor, the processes of the embodiment of the foregoing method for information transmission can be implemented, with same technical effects achieved. To avoid repetition, details are not described herein again. The computer-readable storage medium is, for example, a read-only memory (ROM), a random access memory (RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the method described in the embodiments of this disclosure. The foregoing storage medium includes: any medium that can store program code, such as a USB flash drive, a removable hard disk, a ROM, a RAM, a magnetic disk, or an optical disc.

A person of ordinary skill in the art may understand that all or some of the processes of the methods in the embodiments may be implemented by a computer program controlling relevant hardware. The program may be stored in a computer-readable storage medium. When the program is executed, the processes of the method embodiments may be included. The storage medium may be a magnetic disk, an optical disc, a read-only memory (ROM), a random access memory (RAM), or the like.

It may be understood that the embodiments described in this disclosure may be implemented by hardware, software, firmware, middleware, microcode, or a combination thereof. For hardware implementations, processing units can be implemented in one or more application specific integrated circuits (ASIC), digital signal processors (DSP), digital signal processing devices (DSPD), programmable logic devices (PLD), field-programmable gate arrays (FPGA), general-purpose processors, microcontrollers, microprocessors, other electronic units for performing the functions described in this disclosure, or a combination thereof.

For software implementation, the techniques described in the embodiments of this disclosure may be implemented by modules (such as processes and functions) that perform the functions described in the embodiments of this disclosure. Software code may be stored in the memory and executed by the processor. The memory may be implemented in or outside the processor.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A method for information transmission, performed by a terminal device and comprising:
   reporting reference time interest information to a network-side device; wherein
   the reference time interest information is used to indicate whether the terminal device is interested in a reference time delivered by the network-side device;
   the reference time comprises at least one of the following:
   coordinated universal time (UTC);
   daylight saving time (DST);
   global positioning system (GPS) time; or
   local time;

wherein the reporting the reference time interest information to the network-side device comprises:
   in response to first indication information received from the network-side device indicating that the terminal device is allowed to report the reference time interest information, reporting the reference time interest information to the network-side device, wherein the first indication information is used to indicate whether reporting of the reference time interest information is allowed.

2. The method according to claim 1, wherein the reference time interest information comprises at least one of the following:
   reference time information of interest; and
   reference time information of no interest.

3. The method according to claim 2, wherein the reference time information comprises at least one of the following:
   type of reference time;
   time precision of reference time; and
   clock source of reference time.

4. The method according to claim 1, wherein a trigger condition for reporting the reference time interest information by the terminal device to the network-side device comprises one of the following:
   the terminal device is interested in at least one piece of reference time information;
   the terminal device is not interested in at least one piece of reference time information;
   the terminal device has changed interest in at least one piece of reference time information;
   first content reported by the terminal device has changed, wherein the first content comprises content of reference time information of interest reported by the terminal device or content of reference time information of no interest reported by the terminal device; and
   the terminal device detects that reference time information received by the terminal device needs to be corrected.

5. The method according to claim 4, wherein a determining condition for the terminal device to detect that the reference time information received by the terminal device needs to be corrected comprises one of the following:
   a path loss measured by the terminal device is greater than or equal to a first threshold;
   a path loss variation measured by the terminal device is greater than or equal to a second threshold;
   an uplink timing advance of the terminal device is greater than or equal to a third threshold;
   an uplink timing advance variation measured by the terminal device is greater than or equal to a fourth threshold; and
   indication information received by the terminal device from the network-side device indicates that a cell requires to correct the reference time information.

6. The method according to claim 1, wherein after the reporting reference time interest information to a network-side device, the method further comprises:
   starting a prohibit timer; wherein
   before the prohibit timer expires, the terminal device is prohibited from reporting reference time interest information;
   wherein a parameter of the prohibit timer is predefined by a protocol or configured by a network side.

7. A method for information transmission, performed by a network-side device and comprising:
   receiving reference time interest information reported by a terminal device; wherein

25 the reference time interest information is used to indicate whether the terminal device is interested in a reference time delivered by the network-side device;

the reference time comprises at least one of the following:

coordinated universal time (UTC);

daylight saving time (DST);

global positioning system (GPS) time; or local time;

wherein the method further comprises:

transmitting first indication information to the terminal device, wherein the first indication information is used to indicate whether the terminal device is allowed to report the reference time interest information.

8. The method according to claim 7, further comprising:

configuring a parameter of a prohibit timer for the terminal device.

9. The method according to claim 7, wherein the reference time interest information comprises at least one of the following:

reference time information of interest; and reference time information of no interest.

10. The method according to claim 9, wherein the reference time information comprises at least one of the following:

type of reference time;

time precision of reference time; and clock source of reference time.

11. The method according to claim 7, wherein the network-side device is a source node; and after the receiving reference time interest information reported by a terminal device, the method further comprises:

transmitting the reference time interest information to a destination node.

12. A terminal device, comprising a processor, a memory, and a computer program stored in the memory and capable of running on the processor, wherein when the computer program is executed by the processor, a method for information transmission is implemented, and the method comprises:

reporting reference time interest information to a network-side device; wherein the reference time interest information is used to indicate whether the terminal device is interested in a reference time delivered by the network-side device;

the reference time comprises at least one of the following:

coordinated universal time (UTC);

daylight saving time (DST);

global positioning system (GPS) time; or local time;

wherein the reporting the reference time interest information to the network-side device comprises:

in response to first indication information received from the network-side device indicating that the terminal device is allowed to report the reference time interest information, reporting the reference time interest information to the network-side device, wherein the first indication information is used to indicate whether reporting of the reference time interest information is allowed.

13. The terminal device according to claim 12, wherein the reference time interest information comprises at least one of the following:

reference time information of interest; and reference time information of no interest.

14. The terminal device according to claim 12, wherein a trigger condition for reporting the reference time interest information by the terminal device to the network-side device comprises one of the following:

the terminal device is interested in at least one piece of reference time information;

the terminal device is not interested in at least one piece of reference time information;

the terminal device has changed interest in at least one piece of reference time information;

first content reported by the terminal device has changed, wherein the first content comprises content of reference time information of interest reported by the terminal device or content of reference time information of no interest reported by the terminal device; and the terminal device detects that reference time information received by the terminal device needs to be corrected.

15. The terminal device according to claim 12, wherein after the reporting reference time interest information to a network-side device, the method further comprises:

starting a prohibit timer; wherein before the prohibit timer expires, the terminal device is prohibited from reporting reference time interest information;

wherein a parameter of the prohibit timer is predefined by a protocol or configured by a network side.

16. A network-side device, comprising a processor, a memory, and a computer program stored in the memory and capable of running on the processor, wherein when the computer program is executed by the processor, the steps of the method for information transmission according to claim 7 are implemented.

17. The network-side device according to claim 16, wherein the method further comprises:

configuring a parameter of a prohibit timer for the terminal device.

18. The network-side device according to claim 16, wherein the reference time interest information comprises at least one of the following:

reference time information of interest; and reference time information of no interest.

* * * * *